US012773654B2

(12) United States Patent
Suzuki et al.

(10) Patent No.: US 12,773,654 B2
(45) Date of Patent: Oct. 27, 2026

(54) GAS-LIQUID SEPARATOR

(71) Applicant: USUI CO., LTD., Shizuoka (JP)

(72) Inventors: Tetsunobu Suzuki, Shizuoka (JP); Masaru Suzuki, Shizuoka (JP)

(73) Assignee: USUI CO., LTD., Shizuoka (JP)

( * ) Notice: Subject to any disclaimer, the term of this patent is extended or adjusted under 35 U.S.C. 154(b) by 367 days.

(21) Appl. No.: 18/268,075

(22) PCT Filed: Dec. 27, 2021

(86) PCT No.: PCT/JP2021/048474
§ 371 (c)(1),
(2) Date: Jun. 16, 2023

(87) PCT Pub. No.: WO2022/145406
PCT Pub. Date: Jul. 7, 2022

(65) Prior Publication Data

US 2024/0293767 A1 Sep. 5, 2024

(30) Foreign Application Priority Data

Dec. 28, 2020 (JP) ................................ 2020-219259

(51) Int. Cl.
*B01D 45/00* (2006.01)
*B01D 45/14* (2006.01)
(Continued)

(52) U.S. Cl.
CPC ....... *B01D 45/14* (2013.01); *F02M 35/10222* (2013.01); *F02M 35/10262* (2013.01); *B01D 19/0042* (2013.01); *B01D 19/0094* (2013.01)

(58) Field of Classification Search
CPC ................ B01D 45/14; B01D 19/0042; B01D 19/0094; B01D 45/12; F02M 35/10222;
(Continued)

(56) References Cited

U.S. PATENT DOCUMENTS 6,190,438 B1 2/2001 Parks
7,846,228 B1 * 12/2010 Saaski ................. B01D 46/521 55/423

(Continued)

FOREIGN PATENT DOCUMENTS

CN 110180220 A 8/2019
EP 4083541 A1 11/2022

(Continued)

OTHER PUBLICATIONS

Extended European Search Report from corresponding Application No. 21915266.7, dated Sep. 9, 2024, 7 pages.

(Continued)

*Primary Examiner* — T. Bennett Mckenzie
(74) *Attorney, Agent, or Firm* — Tucker Ellis LLP

(57) ABSTRACT

A gas-liquid separator includes a pipe member through which a gas-liquid two-phase fluid flows; and a swirling flow generator configured to swirl the gas-liquid two-phase fluid to separate gas and liquid therefrom. The swirling flow generator includes blades spirally curved about a central axis of the pipe member. The blade includes a distal end in a pipe radial direction. The distal ends of the blades is continuous over an entire circumference of the pipe member when the pipe member is viewed from an axial direction thereof. A communication portion is provided between the pipe member and the swirling flow generator by forming a bulging portion formed on an inner circumferential surface of the pipe member to extend in the axial direction. The communication portion is configured to communicate a first space upstream of the swirling flow generator with a second space downstream of the swirling flow generator.

7 Claims, 9 Drawing Sheets

(51) Int. Cl.
*F02M 35/10* (2006.01)
*B01D 19/00* (2006.01)

(58) Field of Classification Search
CPC .............. F02M 35/10262; F02M 26/35; B04C 2003/006; B04C 3/06
USPC ............................................................ 55/400
See application file for complete search history.

(56) References Cited

U.S. PATENT DOCUMENTS

| | | | | |
|---|---|---|---|---|
| 9,266,042 | B2 | 2/2016 | Kvamsdal et al. | |
| 2008/0006011 | A1* | 1/2008 | Larnholm | B01D 45/12 95/35 |
| 2015/0230416 | A1* | 8/2015 | Lo | A01G 9/02 47/79 |
| 2018/0361289 | A1 | 12/2018 | Suzuki et al. | |
| 2020/0277919 | A1 | 9/2020 | Suzuki et al. | |
| 2020/0353394 | A1* | 11/2020 | Chen | B01D 45/14 |
| 2020/0370517 | A1 | 11/2020 | Suzuki et al. | |
| 2020/0386195 | A1 | 12/2020 | Suzuki et al. | |
| 2022/0404078 | A1* | 12/2022 | Yokoyama | B04C 3/06 |

FOREIGN PATENT DOCUMENTS

| | | | |
|---|---|---|---|
| JP | S552458 | U | 1/1980 |
| JP | 2005000864 | A | 1/2005 |
| JP | 2010104906 | A | 5/2010 |
| JP | 2010115627 | A | 5/2010 |
| JP | 2011161427 | A | 8/2011 |
| WO | 9829179 | A1 | 7/1998 |
| WO | 2018110351 | A1 | 6/2018 |

OTHER PUBLICATIONS

International Search Report from corresponding International Application No. PCT/JP2021/048474, dated Mar. 22, 2022, 4 pages with translation.

Chinese Office Action from corresponding Application No. 202180087076.0 mailed on Jun. 27, 2025, 22 pages with translation.

* cited by examiner

GAS-LIQUID SEPARATOR

CROSS-REFERENCE TO RELATED APPLICATION

The present application is based upon and claims the benefit of priority from Japanese Patent Application No. 2020-219259 filed with the Japan Patent Office on Dec. 28, 2020, the entire disclosure of which is entirely incorporated herein by reference.

TECHNICAL FIELD

The present disclosure relates to a gas-liquid separator that separates gas and liquid in a gas-liquid two-phase fluid.

BACKGROUND ART

In the prior art, a gas-liquid separator that swirls a gas-liquid two-phase fluid flowing through a pipe member by a swirling flow generator and separates the gas-liquid two-phase fluid into gas and liquid (see Patent Literature 1: JP 2010-104906 A, for example) is known.

SUMMARY

In a conventional gas-liquid separator, the swirling flow generator includes blades extending spirally from the central axis of the pipe member. The distal ends of the blades in the pipe radial direction are continuous around the entire circumference of the pipe member when the pipe member is viewed from the axial direction thereof. Accordingly, there is no gap extending in the axial direction between adjacent blades. In addition, each of the blades contacts the inner circumferential surface of the pipe member along the entire length of the blade. When the gas-liquid two-phase fluid is at a low flow rate, the liquid does not become fine particles but naturally separates from the gas before swirling to become water droplets attached to the inner circumferential surface of the pipe member. The liquid in the form of water droplets flows along the pipe axial direction within the pipe member by the flow of gas. However, the flow is obstructed by the blades of the swirling flow generator because the blades are in contact with the inner circumferential surface of the pipe member. For this reason, it is necessary to provide a drain pipe at a position upstream of the swirling flow generator in the flow direction of the gas-liquid two-phase fluid to guide the water droplets to a water storage tank before the water droplets flow into a region where the swirling flow generator is located.

However, in the case where the drain pipe is provided and/or the drain pipe is connected to the water storage tank, such configuration deteriorates the degree of freedom to arrange various members of the gas-liquid separator and hinders cost reduction as the gas-liquid separator.

The present disclosure has been made in view of the above issues, and an object of the present disclosure is to provide a gas-liquid separator capable of collecting liquid at a position downstream of a swirling flow generator regardless of a flow rate of a gas-liquid two-phase fluid.

In order to achieve the above object, a gas-liquid separator of the present disclosure includes a pipe member through which a gas-liquid two-phase fluid flows, the gas-liquid two-phase fluid including gas and liquid; and a swirling flow generator within the pipe member. The swirling flow generator is configured to swirl the gas-liquid two-phase fluid to separate the gas and the liquid therefrom. The swirling flow generator includes blades that are spirally curved about a central axis of the pipe member. Each of the blades comprises a distal end in a pipe radial direction of the pipe member. The distal ends of the blades are continuous over an entire circumference of the pipe member when the pipe member is viewed from an axial direction thereof. A communication portion is provided between the pipe member and the swirling flow generator by forming a bulging portion. The bulging portion is formed on an inner circumferential surface of the pipe member to extend in the axial direction. The communication portion is configured to communicate a first space upstream of the swirling flow generator with a second space downstream of the swirling flow generator.

DETAILED DESCRIPTION

Figure 1:
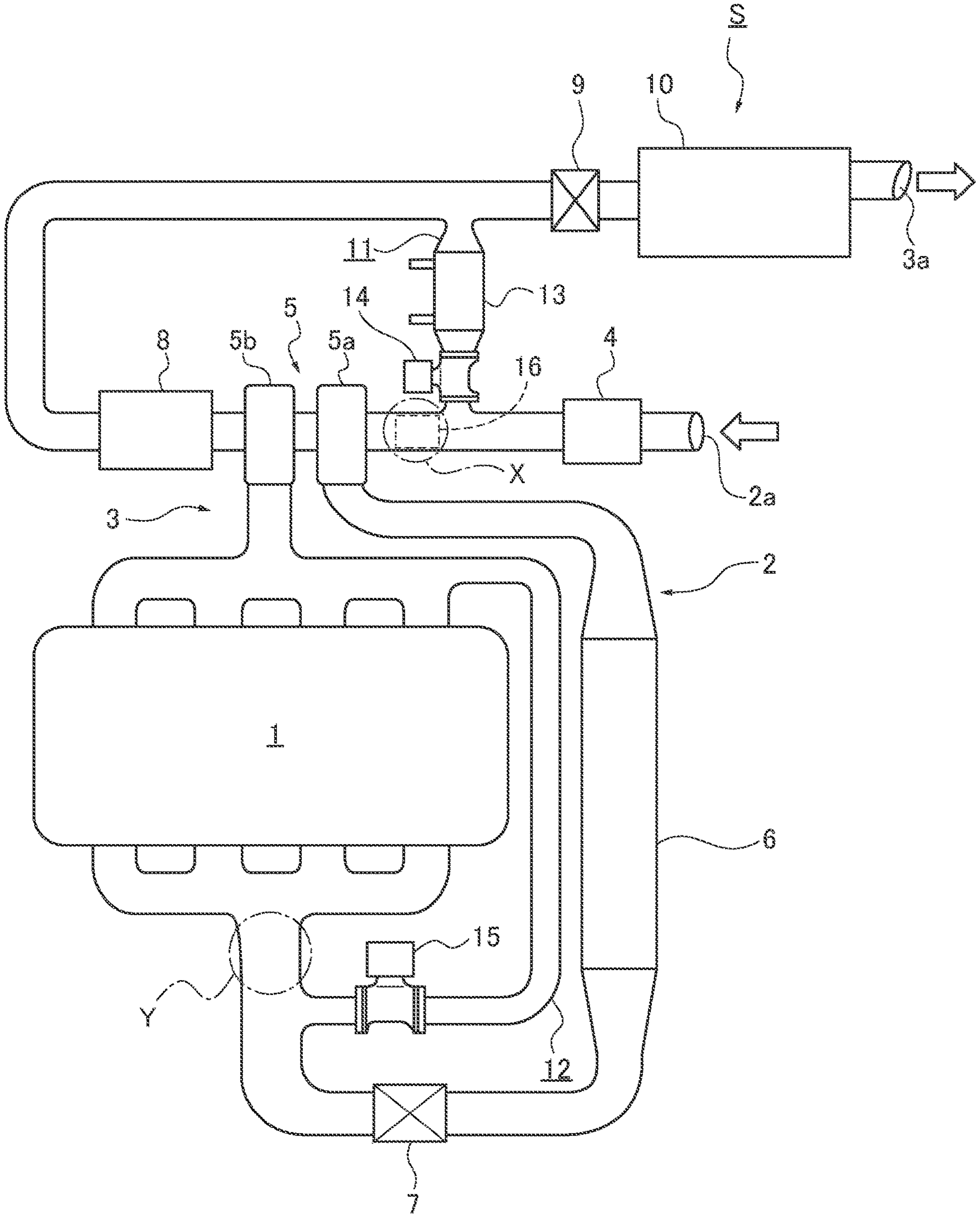
FIG. 1 is an overall system diagram illustrating an exhaust gas recirculation system of an internal combustion engine to which a gas-liquid separator of a first embodiment is applied.

Hereinafter, an embodiment of a gas-liquid separator of the present disclosure is described based on a first embodiment illustrated in the drawings.

(First Embodiment) First, a configuration of the gas-liquid separator in the first embodiment is described separately with headings "Entire System Configuration of Application Example", "Detailed Configuration of Gas-liquid Separator", and "Detailed Configuration of Swirling Flow Generator".

(Entire System Configuration of Application Example) FIG. 1 is an overall system diagram illustrating an exhaust gas recirculation system S of an internal combustion engine 1 to which a gas-liquid separator 16 of the first embodiment is applied. The gas-liquid separator 16 of the first embodiment is applied to the exhaust gas recirculation system S of the internal combustion engine 1 illustrated in FIG. 1. Here, the internal combustion engine 1 illustrated in FIG. 1 is a diesel engine mounted on a vehicle as a driving source for traveling and includes four cylinders (not illustrated). An intake passage 2 and an exhaust passage 3 are connected to each cylinder.

An intake passage 2 includes an intake port 2*a* at an end thereof. The intake passage 2 is provided with an air cleaner 4 for filtering intake gas, a compressor 5*a* of a turbocharger 5, an intercooler 6 for cooling intake gas, and a throttle valve 7 for adjusting the amount of the intake gas in this order from the intake port 2*a* side. The exhaust passage 3 is provided with a turbine 5*b* of the turbocharger 5, an exhaust purification catalyst 8 for purifying exhaust gas, and an exhaust throttle valve 9 for adjusting the flow rate of the exhaust gas in this order from the internal combustion engine 1 side. Note that a muffler 10 is provided downstream of the exhaust throttle valve 9, and an exhaust port 3*a* is formed downstream of the muffler 10.

The intake passage 2 and the exhaust passage 3 are connected by a low-pressure EGR passage 11 and a high-pressure EGR passage 12.

The "EGR" is an abbreviation of "exhaust gas recirculation" which is a technique of taking out a portion of the exhaust gas after combustion in the internal combustion engine 1 and taking in the exhaust gas again and is also referred to as exhaust gas recirculation.

The low-pressure EGR passage 11 connects the intake passage 2 upstream of the compressor 5*a* and the exhaust passage 3 downstream of the exhaust purification catalyst 8. On the other hand, the high-pressure EGR passage 12 connects the intake passage 2 downstream of the compressor 5*a* and the exhaust passage 3 upstream of the turbine 5*b*. Thereby, in the low-pressure EGR passage 11, the exhaust gas that passes through the turbine 5*b* returns to the intake side of the compressor 5*a*. In the high-pressure EGR passage 12, the exhaust gas before flowing into the turbine 5*b* returns to the intake side that passes through the compressor 5*a*.

The low-pressure EGR passage 11 is provided with an EGR cooler 13 and a low-pressure EGR valve 14. The EGR cooler 13 is configured to cool the exhaust gas guided to the intake passage 2. The low-pressure EGR valve 14 is configured to adjust the flow rate of the exhaust gas recirculated to the intake passage 2 via the low-pressure EGR passage 11. The high-pressure EGR passage 12 is provided with a high-pressure EGR valve 15. The high-pressure EGR valve 15 is configured to adjust the flow rate of the exhaust gas recirculated to the intake passage 2 via the high-pressure EGR passage 12.

In the low-pressure EGR passage 11, the exhaust gas can be recirculated without reducing the turbine passage exhaust amount of the turbocharger 5, and the NOx reduction effect is large. However, it is concerned that condensed water may be generated by cooling the EGR gas in the EGR cooler 13 or by mixing the EGR gas with the air during cold weather. Therefore, in the exhaust gas recirculation system S of the first embodiment, the gas-liquid separator 16 is provided at a position downstream of the low-pressure EGR valve 14 and upstream of the compressor 5*a* of the turbocharger 5 (a position surrounded by an alternate long and short dash line X shown in FIG. 1) to collect and discharge the condensed water by the gas-liquid separator 16.

Figure 2:
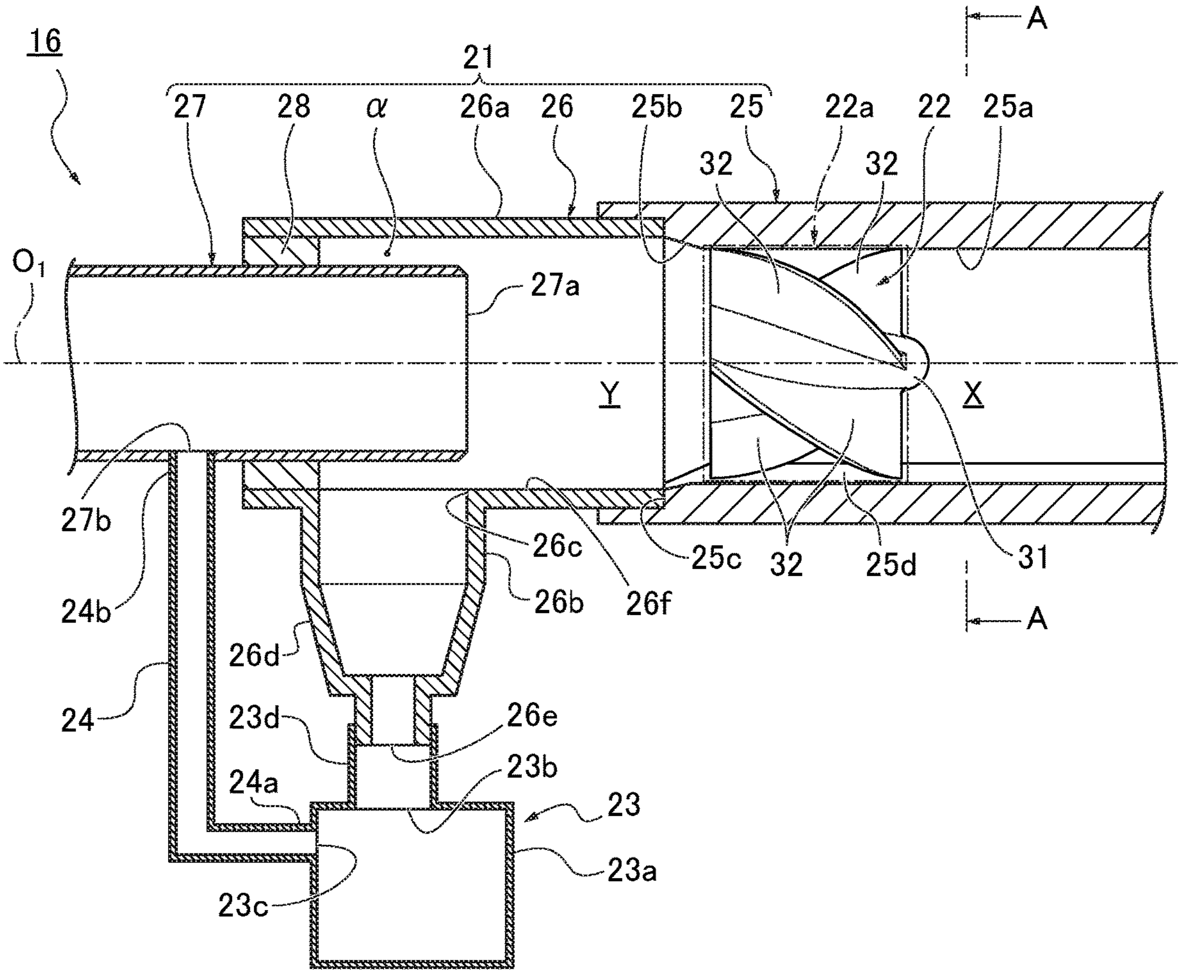
FIG. 2 is a cross-sectional view illustrating the gas-liquid separator of the first embodiment.

(Detailed Configuration of Gas-liquid Separator) FIG. 2 is a cross-sectional view illustrating the gas-liquid separator 16 of the first embodiment. The gas-liquid separator 16 of the first embodiment includes a pipe member 21, a swirling flow generator 22, a water storage tank 23, and a bypass pipe 24.

The pipe member 21 has a first end that communicates with the intake port 2*a* and the low-pressure EGR valve 14 and a second end that communicates with the compressor 5*a* of the turbocharger 5 and exhaust gas in a state where gas and particulate liquid (condensed water) are mixed (hereinafter, referred to as "gas-liquid two-phase fluid") flows. Further, the pipe member 21 is disposed such that a central axis $O_1$ is arranged along the horizontal direction when mounted on the vehicle. The pipe member 21 is formed by connecting three pipes, namely, a first pipe 25, a second pipe 26, and a third pipe 27. The first pipe 25, the second pipe 26, and the third pipe 27 are sequentially connected from the upstream side in the flow direction of the gas-liquid two-phase fluid (the right side in FIG. 2, hereinafter referred to as a "fluid entering side") toward the downstream side in the flow direction of the gas-liquid two-phase fluid (the left side in FIG. 2, hereinafter referred to as a "fluid exiting side").

In the following description, the axial direction of the pipe member 21 (direction along the central axis $O_1$) is referred to as a "pipe axial direction", and the radial direction of the pipe member 21 (direction orthogonal to the central axis $O_1$) is referred to as a "pipe radial direction". Further, the circumferential direction of the pipe member 21 (the circumferential direction about the central axis $O_1$) is referred to as a "pipe circumferential direction".

The first pipe 25 is a straight pipe member in which the swirling flow generator 22 is provided. The first pipe 25 includes a swirling region 22*a*, a tapered region 25*b*, and a stepped portion 25*c* therewithin. The swirling region 22*a* is a region in which the swirling flow generator 22 is disposed. The tapered region 25*b* is a region in which the inner diameter dimension of the first pipe 25 gradually increases toward the fluid exiting side. The stepped portion 25*c* is a portion on which the second pipe 26 abuts. Here, the tapered region 25*b* is formed on the fluid exiting side of the swirling region 22*a*. The stepped portion 25*c* is formed on the fluid exiting side of the tapered region 25*b*. The inner diameter dimension of the first pipe 25 increases in the order of the swirling region 22*a*, the tapered region 25*b*, and the stepped portion 25*c*.

In addition, a bulging portion 25*d* is formed on an inner circumferential surface 25*a* of the first pipe 25. The bulging portion 25*d* is formed by protruding or denting a part of the inner circumferential surface 25*a* outwardly in the pipe radial direction to have steps. The bulging portion 25*d* has a groove-like shape and extends in the pipe axial direction. Also, the bulging portion 25*d* extends from an end portion (not illustrated) on the fluid entering side of the first pipe 25 at least to an end portion on the fluid exiting side of the swirling region 22*a*. Further, the bulging portion 25*d* has a predetermined width dimension W along the horizontal direction. A central position 25*e* of the bulging portion 25*d* in the pipe circumferential direction is positioned below the central axis $O_1$ of the pipe member 21 in the vertical direction.

Moreover, the bulging portion 25*d* includes a bottom surface 25*f* which is flat in the horizontal direction. The bulging portion 25*d* has a depth H (i.e., a distance between the inner circumferential surface 25*a* of the first pipe 25 and the bottom surface 25*f* of the bulging portion 25*d*). The depth H of the bulging portion 25*d* includes end portions and the central position 25*e* in the pipe circumferential direction. The depth His the shallowest at the central position 25*e* and gradually deepens toward both end portions in the pipe circumferential direction.

The second pipe 26 is a T-shaped pipe member including a horizontal portion 26*a* and a vertical portion 26*b*. The horizontal portion 26*a* is connected to the first pipe 25. The vertical portion 26*b* is connected to the horizontal portion 26*a* in an orthogonal state.

The horizontal portion 26*a* includes a first end that is inserted into the first pipe 25. The first end of the horizontal portion 26*a* is in contact with the inner circumferential surface 25*a* of the first pipe 25 when inserted into the first pipe 25. Also, the first end of the horizontal portion 26*a* abuts the stepped portion 25*c*. The axial direction of the horizontal portion 26*a* coincides with the central axis $O_1$ of the pipe member 21 and extends in the horizontal direction.

A drain opening 26*c* is formed at a connection portion between the horizontal portion 26*a* and the vertical portion 26*b*. The horizontal portion 26*a* and the vertical portion 26*b* communicate with each other. The drain opening 26*c* opens in the gravity direction (downward in the vertical direction of the central axis $O_1$). The vertical portion 26*b* extends from the horizontal portion 26*a* along the gravity direction. As a result, the liquid separated from the gas-liquid two-phase fluid flows down by its weight through the vertical portion 26*b* via the drain opening 26*c*.

In addition, the vertical portion 26*b* is connected to a contracted or tapered portion 26*d*. In the tapered portion 26*d*, the distribution area for the liquid gradually becomes smaller downward at the intermediate portion. A distal end opening 26*e* is formed at the distal end (lower end) of the tapered portion 26*d*. Because of the tapered portion 26*d*, the opening area of the distal end opening 26*e* is smaller than that of the drain opening 26*c*. The vertical portion 26*b*, the drain opening 26*c*, the tapered portion 26*d*, and the distal end opening 26*e* correspond to a drain pipe.

The third pipe 27 is a straight pipe member that is inserted into a second end of the horizontal portion 26*a* of the second pipe 26. The third pipe 27 has an outer diameter in which a gap a is generated between the outer circumferential surface of the third pipe 27 and the inner circumferential surface of the horizontal portion 26*a* when the third pipe 27 is inserted into the second pipe 26. A spacer 28 is fitted in the gap a. The spacer 28 has a cylindrical shape surrounding the entire outer circumferential surface of the third pipe 27 and is in contact with the horizontal portion 26*a* of the second pipe 26 and the third pipe 27. That is, the second end of the horizontal portion 26*a* is closed by the spacer 28. The third pipe 27 is inserted into the second pipe 26 until a first end portion 27*a* is positioned above the drain opening 26*c*. In addition, the third pipe 27 includes a vent 27*b* penetrating the circumferential surface of the third pipe 27. The vent 27*b* is formed at a position where the third pipe 27 protrudes from the second pipe 26. The vent 27*b* is connected to a second end portion 24*b* of the bypass pipe 24.

The water storage tank 23 includes a tank body 23*a* disposed below the vertical portion 26*b* of the second pipe 26. The tank body 23*a* includes a first opening 23*b* formed on an upper surface, a second opening 23*c* formed on a side surface, and a drain opening (not shown) formed on a bottom surface.

The first opening 23*b* is connected to the distal end opening 26*e* of the vertical portion 26*b* via a communication pipe 23*d*. The second opening 23*c* is connected to a first end portion 24*a* of the bypass pipe 24. The drain opening can be opened and closed as appropriate. The drain opening can be opened when the liquid stored in the tank body 23*a* reaches a certain amount to discharge the stored liquid to the outside of the tank.

The bypass pipe 24 is a tubular member with both ends open. The bypass pipe 24 includes the first end portion 24*a* connected to the second opening 23*c* of the tank body 23*a* and the second end portion 24*b* connected to the vent 27*b* of the third pipe 27. Accordingly, the internal space of the tank body 23*a* communicates with the inside of the third pipe 27 via the bypass pipe 24.

Figure 3A:
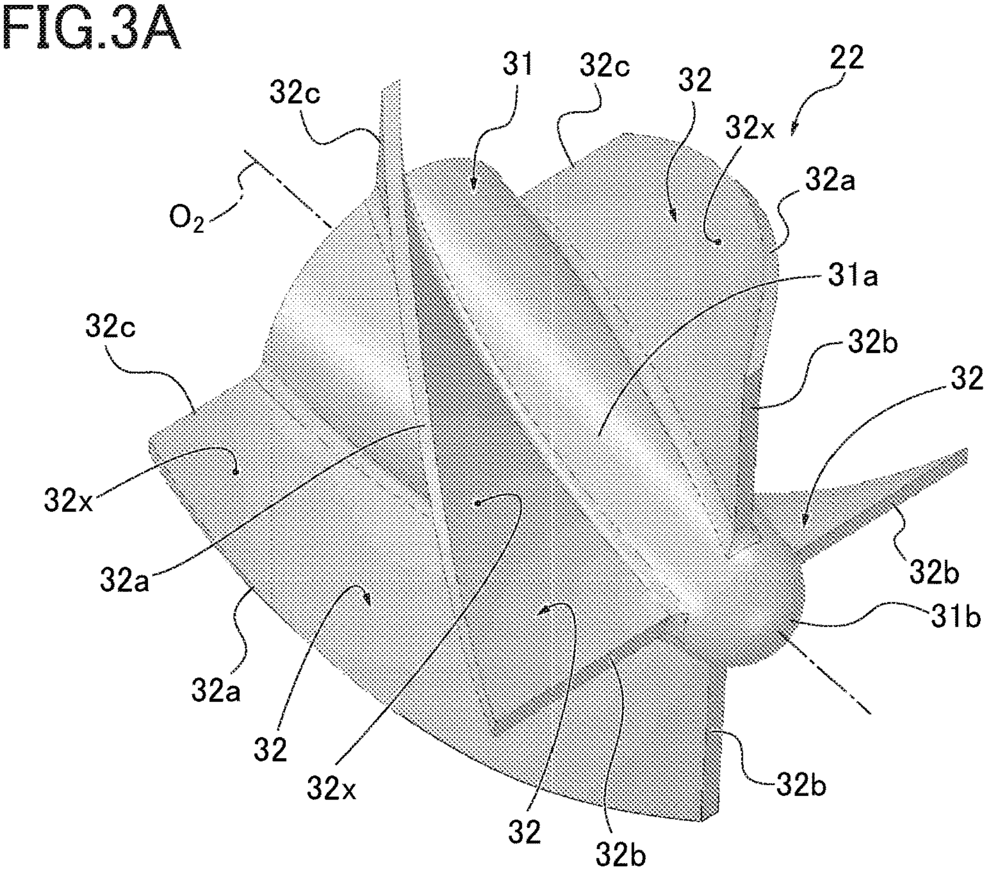
FIG. 3A is a perspective view illustrating a swirling flow generator of the first embodiment.
Figure 3B:
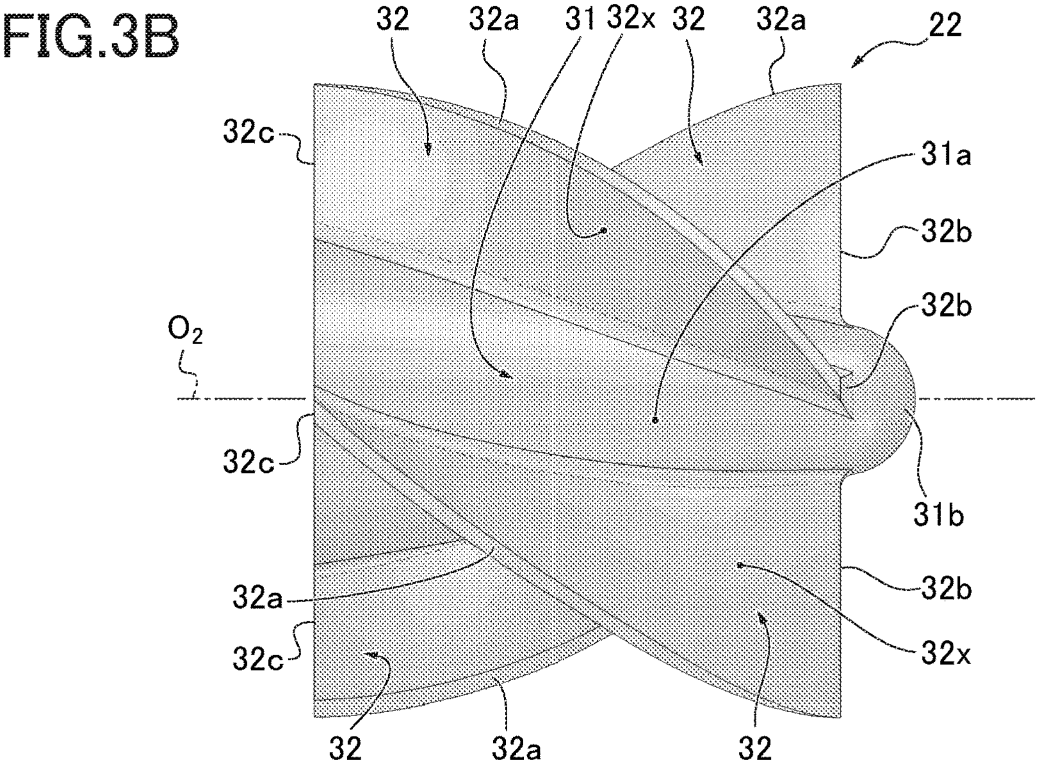
FIG. 3B is a side view illustrating the swirling flow generator of the first embodiment.

(Detailed Configuration of Swirling Flow Generator) The swirling flow generator 22 of the first embodiment is disposed in the swirling region 22*a* of the first pipe 25 to define the flow direction of the gas-liquid two-phase fluid flowing through the pipe member 21 and to swirl the gas-liquid two-phase fluid to be a swirling flow. As illustrated in FIG. 3A, the swirling flow generator 22 includes a blade support portion 31 and a plurality of blades 32 provided on an outer circumferential surface 31*a* of the blade support portion 31. In this embodiment, four blades 32 are provided.

As illustrated in FIG. 3A, the blade support portion 31 has a conical shape in which a distal end portion 31*b* is formed on an R surface. The swirling flow generator 22 is disposed in the swirling region 22*a* in a direction such that the distal end portion 31*b* faces the fluid entering side, and the outer diameter dimension of the blade support portion 31 gradually increases toward the fluid exiting side. When the swirling flow generator 22 is disposed in the swirling region 22*a*, an axial direction $O_2$ of the blade support portion 31 coincides with the central axis $O_1$ of the pipe member 21.

Each of the blades 32 (four blades in this embodiment) protrudes in the pipe radial direction from the outer circumferential surface 31*a* of the blade support portion 31 and provided at equal angular intervals around the axial direction $O_2$ of the blade support portion 31 about the axial direction $O_2$ of the blade support portion 31 so that the blades spirally surround the blade support portion 31. When the swirling flow generator 22 is disposed in the swirling region 22*a*, the axial direction $O_2$ of the blade support portion 31 coincides with the central axis $O_1$ of the pipe member 21. Therefore, in a state where the swirling flow generator 22 is disposed in the swirling region 22*a*, each of the blades 32 extends to be spirally curved about the central axis $O_1$ of the pipe member 21.

Figure 4:
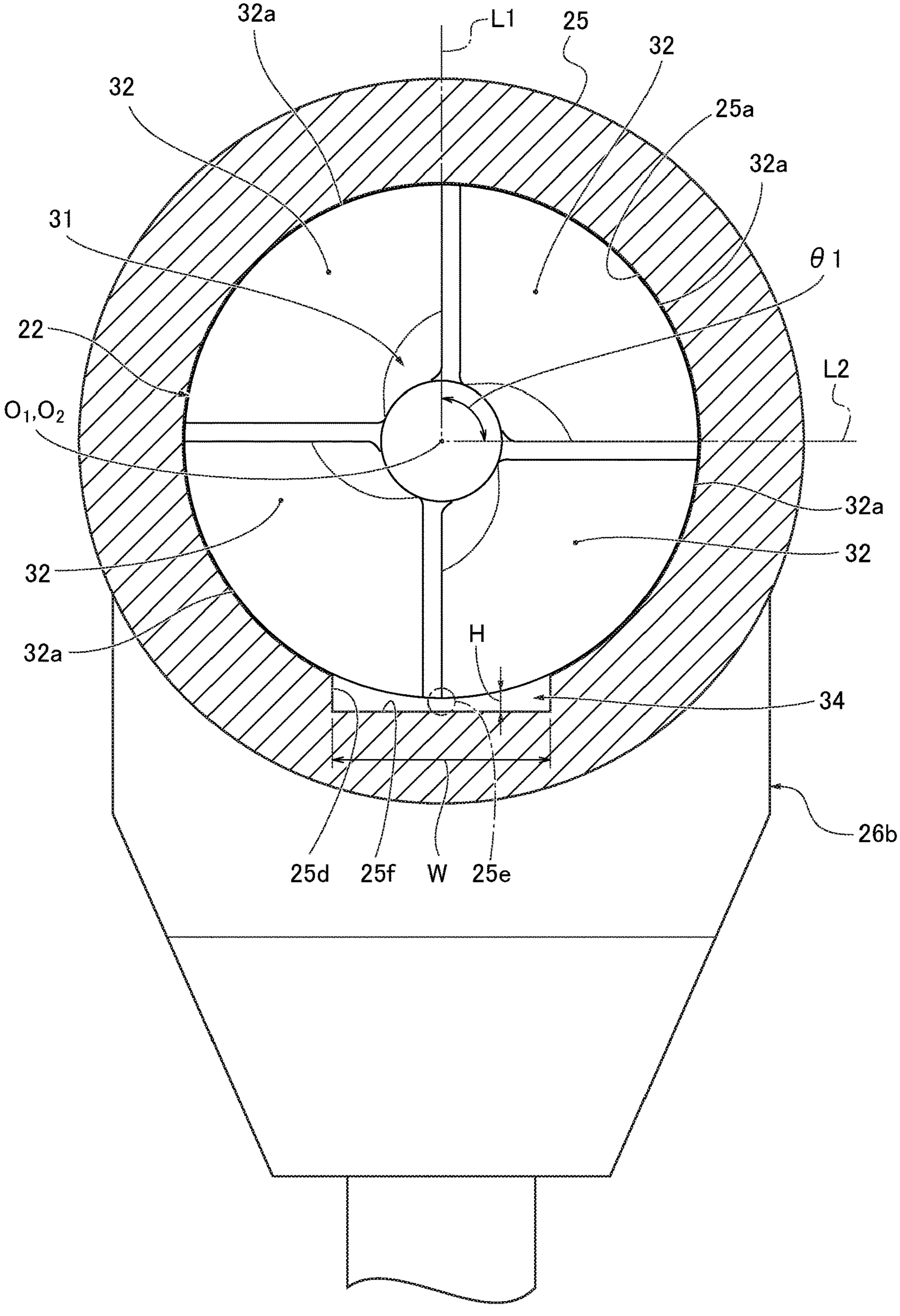
FIG. 4 is a cross-sectional view taken along line A-A illustrated in FIG. 2.

When the swirling flow generator 22 is disposed in the swirling region 22*a*, the distal ends 32*a* of the blades 32, except for a portion facing the bulging portion 25*d* on the inner circumferential surface 25*a* of the first pipe 25, contact the inner circumferential surface 25*a* of the first pipe 25 (the inner circumferential surface of the pipe member 21). A winding angle θ1 of each of the blade 32 with respect to the blade support portion 31 is set to about 90°. The "winding angle θ1" is an angle formed by a protruding direction L1 of the end portion 32*b* of the blade 32 on the fluid entering side and a protruding direction L2 of an end portion 32*c* of the blade 32 on the fluid exiting side when the swirling flow generator 22 is viewed from the pipe axial direction as shown in FIG. 4. Since the winding angle θ1 is about 90°, the end portion 32*c* of the blade 32 on the fluid exiting side overlaps the end portion 32*b* of the adjacent blades 32 on the fluid entering side in the pipe axial direction when the swirling flow generator 22 is viewed from the pipe axial direction. Note that depending on the R shapes generated at the end portions 32*b* and 32*c* and the draft angle of the mold, the end portion 32*b* on the fluid entering side and the end portion 32*c* on the fluid exiting side of the adjacent blades 32 may not overlap each other in the pipe axial direction.

In the swirling flow generator 22, the winding angle θ1 of each of the blades 32 (four blades in this embodiment) is set to about 90°. Accordingly, the distal ends 32*a* of the blades 32 are continuous over the entire circumferences of the pipe members 21 when viewed from the pipe axial direction, as illustrated in FIG. 4. That is, it is possible to surround the central axis $O_1$ of the pipe member 21 with a trajectory along the distal ends 32*a* of the blades 32 in the pipe radial direction when the swirling flow generator 22 is viewed from the pipe axial direction. As a result, no gap extending in the pipe axial direction is generated between opposing side surfaces 32*x* of the adjacent blades 32.

The gas-liquid separator 16 of the first embodiment includes a communication portion 34 between the inner circumferential surface 25*a* of the first pipe 25, which is the pipe member 21, and the distal end 32*a* of the blade 32 of the swirling flow generator 22. The communication portion 34 is formed by providing the bulging portion 25*d* on the inner circumferential surface 25*a* of the first pipe 25 in which the swirling flow generator 22 is disposed. In other words, the communication portion 34 is formed on the inner circumferential surface 25*a* of the first pipe 25. The communication portion 34 is a space that extends in the pipe axial direction and communicates a first space X on the upstream side (fluid entering side) of the swirling region 22*a* where the swirling flow generator 22 is disposed (see FIG. 2) with a second space Y on the downstream side (fluid exiting side) of the swirling region 22*a* (see FIG. 2). The central position of the communication portion 34 in the pipe circumferential direction is coincident with the central position 25*e* of the bulging portion 25*d* in the pipe circumferential direction and is positioned below the central axis $O_1$ in the vertical direction.

In addition, the height of the communication portion 34 is coincident with the depth H of the bulging portion 25*d*. The height of the communication portion 34 is set to be the lowest at the center position in the pipe circumferential direction and the highest at both end portions in the pipe circumferential direction. The height of the communication portion 34 (i.e., the depth H of the bulging portion 25*d*) is set at about 5% of the radius dimension of the pipe member 21 at the lowest center position in the pipe circumferential direction. A width dimension of the communication portion 34 in the horizontal direction is coincident with the width dimension W of the bulging portion 25*d*. The width dimension of the communication portion 34 is set to about 15% of the circumferential length of the inner circumferential surface of the pipe member 21 (the inner circumferential surface 25*a* of the first pipe 25) in the swirling region 22*a*.

Next, operations of the gas-liquid separator 16 of the first embodiment are described separately with headings “Liquid Collecting at High Flow Rate” and “Liquid Collecting at Low Flow Rate”.

(Liquid Collecting at High Flow Rate) In the exhaust gas recirculation system S illustrated in FIG. 1, the outside air taken in from the intake port 2*a* and the exhaust gas taken in from the exhaust passage 3 via the low-pressure EGR passage 11 flow into the compressor 5*a* of the turbocharger 5 at a speed of 5 m/s to 110 m/s. The outside air and the exhaust gas contain moisture. When the gas flowing into the compressor 5*a* is cooled by the EGR cooler 13, if the cooling water temperature is too low or the outside air temperature is low, condensed water is generated and is mixed with the gas to form a gas-liquid two-phase fluid.

When the flow rate of the gas-liquid two-phase fluid is relatively high (for example, 20 m/s to 110 m/s at a high flow rate), the condensed water becomes fine particles and flows in a mixed phase together with the gas.

In the gas-liquid separator 16 of the first embodiment, as illustrated in FIG. 2, the swirling flow generator 22 is disposed inside the first pipe 25 of the pipe member 21. The swirling flow generator 22 includes the plurality of blades 32 protruding in the pipe radial direction from the outer circumferential surface 31*a* of the blade support portion 31 and spirally curving around the central axis $O_1$ of the pipe member 21.

Figure 5:
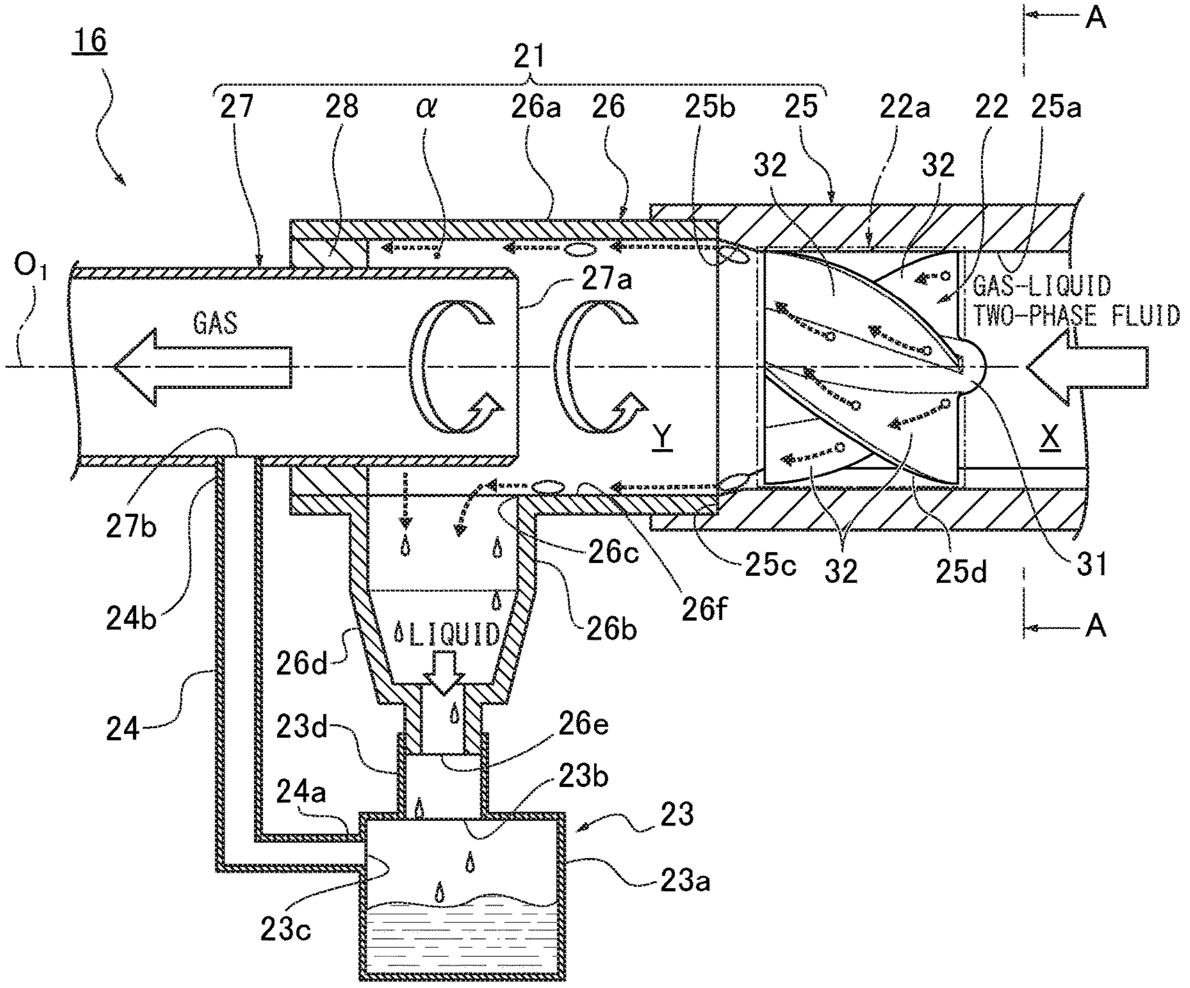
FIG. 5 is an explanatory view illustrating the flow of a gas-liquid two-phase fluid at a high flow rate in the gas-liquid separator of the first embodiment.

Therefore, as illustrated in FIG. 5, the gas-liquid two-phase fluid flowing into the pipe member 21 flows along the blades 32 so that the flow direction of the gas-liquid two-phase fluid is defined and becomes the swirling flow when passing through the swirling region 22*a* where the swirling flow generator 22 is provided. Then, the liquid having a large mass is guided toward the inner circumferential surface 25*a* of the first pipe 25 by the centrifugal force generated by the swirling of the gas-liquid two-phase fluid. The liquid guided to the inner circumferential surface 25*a* of the first pipe 25 adheres to the inner circumferential surface 25*a* of the first pipe 25 and is condensed into water droplets to be separated from the gas. On the other hand, the air from which the liquid is separated flows linearly in the pipe axial direction while swirling from the first pipe 25 to the second pipe 26, and then flows into the third pipe 27.

On the other hand, as illustrated in FIG. 5, the liquid separated from the gas and formed into water droplets passes through the tapered region 25*b* from the swirling region 22*a* and flows to the second pipe 26 while being attached to the inner circumferential surface 25*a* of the first pipe 25 by the flow of the swirling flow. The liquid flowing into the second pipe 26 flows while being attached to an inner circumferential surface 26*f* of the second pipe 26, flows into the drain opening 26*c* and flows down the vertical portion 26*b*. Thereafter, the liquid is discharged through the distal end opening 26*e* and stored in the tank body 23*a*.

As described above, in the gas-liquid separator 16 of the first embodiment, when the gas-liquid two-phase fluid flows at a high flow rate, the gas-liquid two-phase fluid is swirled by the swirling flow generator 22, and the gas and the liquid can be separated by centrifugal force. The gas-liquid separator 16 of the first embodiment guides the liquid toward the inner circumferential surface 25*a* of the first pipe 25 and attaches the liquid to the inner circumferential surface 25*a*, so that the liquid can be collected in the water storage tank 23 while suppressing re-scattering of the liquid.

Figure 6:
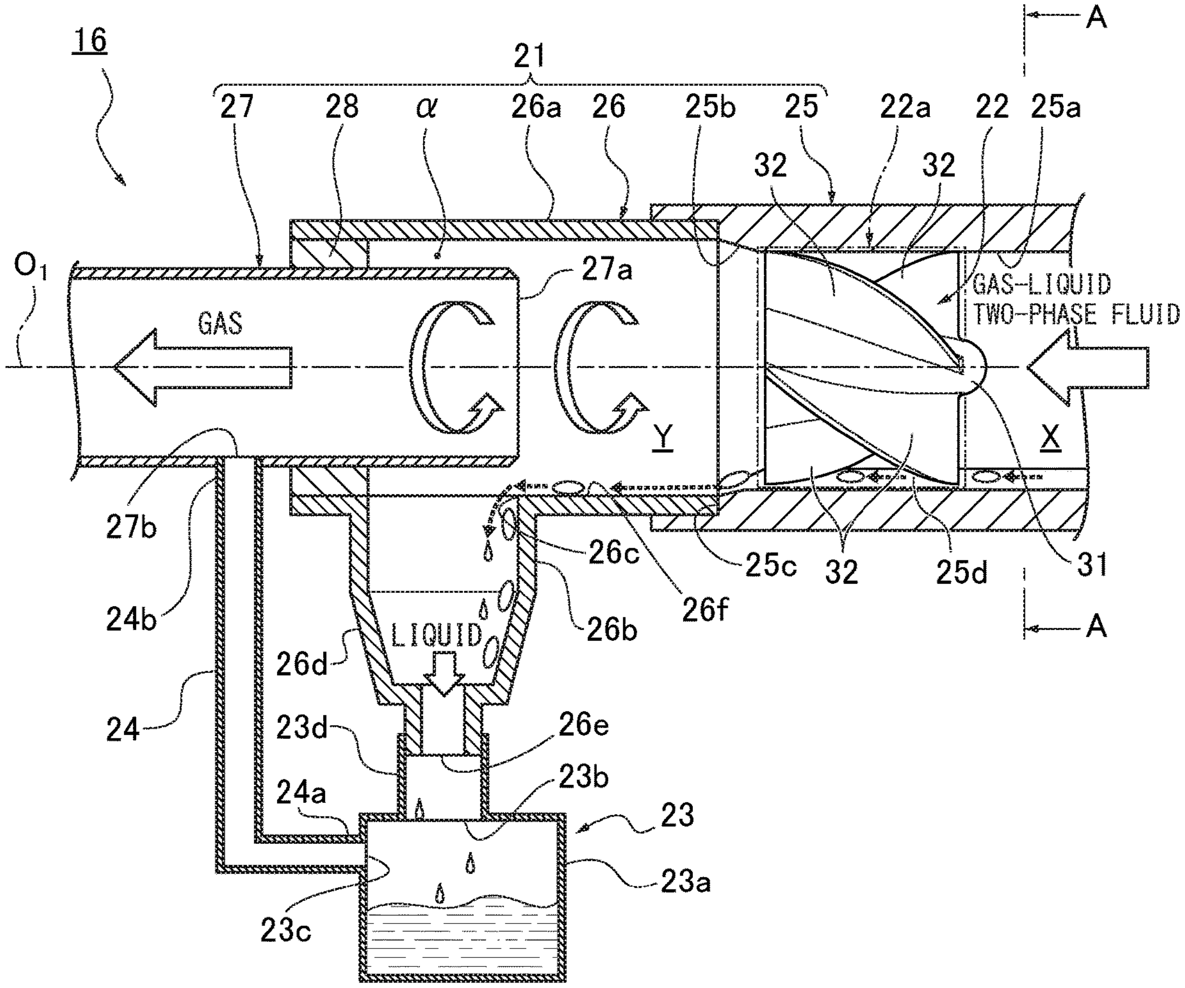
FIG. 6 is an explanatory view illustrating the flow of the gas-liquid two-phase fluid at a low flow rate in the gas-liquid separator of the first embodiment.

(Liquid Collecting at Low Flow Rate) In the exhaust gas recirculation system S of the first embodiment, when the flow rate of the gas-liquid two-phase fluid is relatively slow (at a low flow rate, for example, 5 m/s to 20 m/s), the condensed water is less likely to be fine particles. In this case, as illustrated in FIG. 6, before the gas-liquid two-phase fluid flows into the swirling region 22*a* where the swirling flow generator 22 is disposed, that is, before swirling, the gas and the liquid are naturally separated from each other, and the liquid that has become the water droplets adheres to the inner circumferential surface 25*a* of the first pipe 25. The gas flows from the first pipe 25 to the second pipe 26 and flows into the third pipe 27. When passing through the swirling region 22*a*, the gas flows along the blade 32 to be the swirling flow and flows linearly along the pipe axial direction while swirling.

On the other hand, the liquid adhering to the inner circumferential surface 25*a* of the first pipe 25 cannot flow in a mixed phase together with the gas. The liquid flows toward the swirling region 22*a* while adhering to the inner circumferential surface 25*a* of the first pipe 25 by the flow of the gas.

In the first embodiment, the swirling flow generator 22 includes the blades 32 surrounding the blade support portion 31. The distal ends 32*a* of the blades 32 in the pipe radial direction are in contact with the inner circumferential surface 25*a* of the first pipe 25, and the winding angle $\theta 1$ of each of the blades 32 with respect to the blade support portion 31 is set to about 90°. In addition, the distal ends 32*a* of the blades 32 are continuous over the entire circumference of the pipe member 21 when viewed from the pipe axial direction. The communication portion 34 is provided between the inner circumferential surface 25*a* of the first pipe 25 and the blade 32 of the swirling flow generator 22. The communication portion 34 is formed by the bulging portion 25*d* on the inner circumferential surface 25*a* of the first pipe 25, which is the pipe member 21. The communication portion 34 extends in the pipe axial direction between the first pipe 25 and the swirling flow generator 22 and communicates the first space X upstream of the swirling region 22*a* with the second space Y downstream of the swirling region 22*a*.

Therefore, the liquid (water droplet) separated from the gas before flowing into the swirling region 22*a* flows through the communication portion 34 horizontally to the central axis $O_1$ inside the pipe member 21 so that the liquid (water droplet) flows into the second space Y from the first space X. That is, the liquid adhering to the inner circumferential surface 25*a* of the first pipe 25 can smoothly pass through the swirling region 22*a* without being obstructed by the swirling flow generator 22.

The liquid that has passed through the swirling region 22*a* passes through the tapered region 25*b* while adhering to the inner circumferential surface 25*a* of the first pipe 25, and flows into the second pipe 26. The liquid flowing into the second pipe 26 flows while being attached to an inner circumferential surface 26*f* of the second pipe 26 and flows into the drain opening 26*c* to flow down the vertical portion 26*b*. Then, the liquid is discharged through the distal end opening 26*e* and stored in the tank body 23*a*.

As described above, in the gas-liquid separator 16 of the first embodiment, even when the flow rate of the gas-liquid two-phase fluid is relatively low, and the gas and the liquid are naturally separated before passing through the swirling region 22*a*, the liquid can flow through the communication portion 34 provided between the inner circumferential surface 25*a* of the first pipe 25 and the blade 32. Therefore, even if the distal ends 32*a* of the blades 32 are continuous over the entire circumference of the pipe member 21 when viewed from the pipe axial direction, the flow of the liquid is not obstructed by the blades 32, and the liquid can be collected on the fluid exiting side of the swirling flow generator 22. As a result, regardless of the flow rate of the gas-liquid two-phase fluid, the liquid can be collected at the position downstream of the swirling flow generator 22.

Further, in the gas-liquid separator 16 of the first embodiment, the communication portion 34 consists of the bulging portion 25*d* that is formed on the inner circumferential surface 25*a* of the first pipe 25, which is the pipe member 21, and extends in the pipe axial direction. Therefore, it is unnecessary to form a partial notch or recess in the distal end 32*a* of the blade 32 of the swirling flow generator 22, and thus the swirling flow generator 22 can be easily formed.

In addition, the bulging portion 25*d*, which forms the communication portion 34, has a groove-like shape to extend in the pipe axial direction. Therefore, the shape of the communication portion 34 can be easily set to the desired shape by adjusting the width dimension W in the horizontal direction and the depth H of the bulging portion 25*d*.

In addition, the bulging portion 25*d* formed on a part of the inner circumferential surface 25*a* of the first pipe 25. That is, the width dimension W of the bulging portion 25*d* is shorter than the circumferential length of the inner circumferential surface 25*a*. Therefore, the communication portion 34 becomes a space formed in a portion of the pipe circumferential direction between the inner circumferential surface 25*a* of the first pipe 25 and the blade 32. Thereby, the distal ends 32*a* of the blades 32, except for a portion facing the bulging portion 25*d*, contact the inner circumferential surface 25*a* of the first pipe 25. Therefore, the swirling flow generator 22 is supported by the pipe member 21 and thus the strength of the swirling flow generator 22 against vibration can be ensured.

Also, in the gas-liquid separator 16 of the first embodiment, the central position of the communication portion 34 in the pipe circumferential direction (the central position 25*e* of the bulging portion 25*d* in the pipe circumferential direction) is positioned below the central axis $O_1$ of the pipe member 21 in the gravity direction when viewed in the pipe axial direction. As a result, the liquid flowing down to the lower portion of the pipe member 21 by its weight can flow into the communication portion 34, so that the liquid can be smoothly collected.

Particularly, in the first embodiment, the central position of the communication portion 34 (central position 25*e*) in the pipe circumferential direction is positioned below the central axis $O_1$ of the pipe member 21 in the vertical direction. This ensures that the liquid flowing down to the lower portion of the pipe member 21 by gravity can reliably flow into the communication portion 34.

Moreover, in the gas-liquid separator 16 of the first embodiment, the gap a is generated between the second pipe 26 and the third pipe 27. Therefore, the liquid adhering to the inner circumferential surface 26*f* of the second pipe 26 enters the gap a, which prevents the liquid adhering to the inner circumferential surface 26*f* from flowing into the third pipe 27. In addition, the third pipe 27 on the fluid exiting side is inserted into the second pipe 26. Accordingly, an increase in the outer diameter dimension of the pipe member 21 can be suppressed, and a space required for installing the gas-liquid separator 16 can be suppressed.

In the first embodiment, the spacer 28 is attached to the second end of the horizontal portion 26*a* of the second pipe 26 to close the gap a, thereby, preventing the gas from leaking out between the second pipe 26 and the third pipe 27 and allowing the gas to flow smoothly into the third pipe 27.

In addition, in the first embodiment, the third pipe 27 and the water storage tank 23 communicate with each other via the bypass pipe 24. Therefore, the airflow through the third pipe 27 creates a negative pressure inside the water storage tank 23 and thus the flow of the liquid flowing down the vertical portion 26*b* can be smoothed. In the embodiment illustrated in FIG. 2, the bypass pipe 24 is connected to the second opening 23*c* formed on the side surface of the tank body 23*a*. However, the present disclosure is not limited thereto, and for example, the bypass pipe 24 may be connected to an opening formed on the upper surface of the tank body 23*a*.

Although the gas-liquid separator of the present disclosure has been described based on the first embodiment, the specific configuration of the gas-liquid separator is not limited to the first embodiment. Any modifications, additions, and the like of the design of the gas-liquid separator are allowed without departing from the gist of the invention according to each of the claims.

In the gas-liquid separator 16 of the first embodiment, the central position of the communication portion 34 in the pipe circumferential direction (the central position 25*e* of the bulging portion 25*d* in the pipe circumferential direction) is positioned vertically below the central axis $O_1$ of the pipe member 21. However, the position of the communication portion 34 is not limited thereto. For example, as illustrated in FIG. 7, the central position of the communication portion 34 in the pipe circumferential direction (the central position 25*e* of the bulging portion 25*d* in the pipe circumferential direction) may be set at a position shifted by a predetermined angle in the direction in which the gas-liquid two-phase fluid is swirled by the swirling flow generator 22 (clockwise direction in FIG. 7) with respect to the position vertically below the central axis $O_1$.

As a result, even if a part of the liquid adhering to the inner circumferential surface 25*a* of the first pipe 25 flows in the pipe circumferential direction by the swirling flow, the liquid can flow into the communication portion 34. Therefore, in the gas-liquid separator 16, the flow of the liquid is not obstructed by the swirling flow generator 22, and the liquid can be appropriately collected downstream of the swirling flow generator 22.

Figure 7:
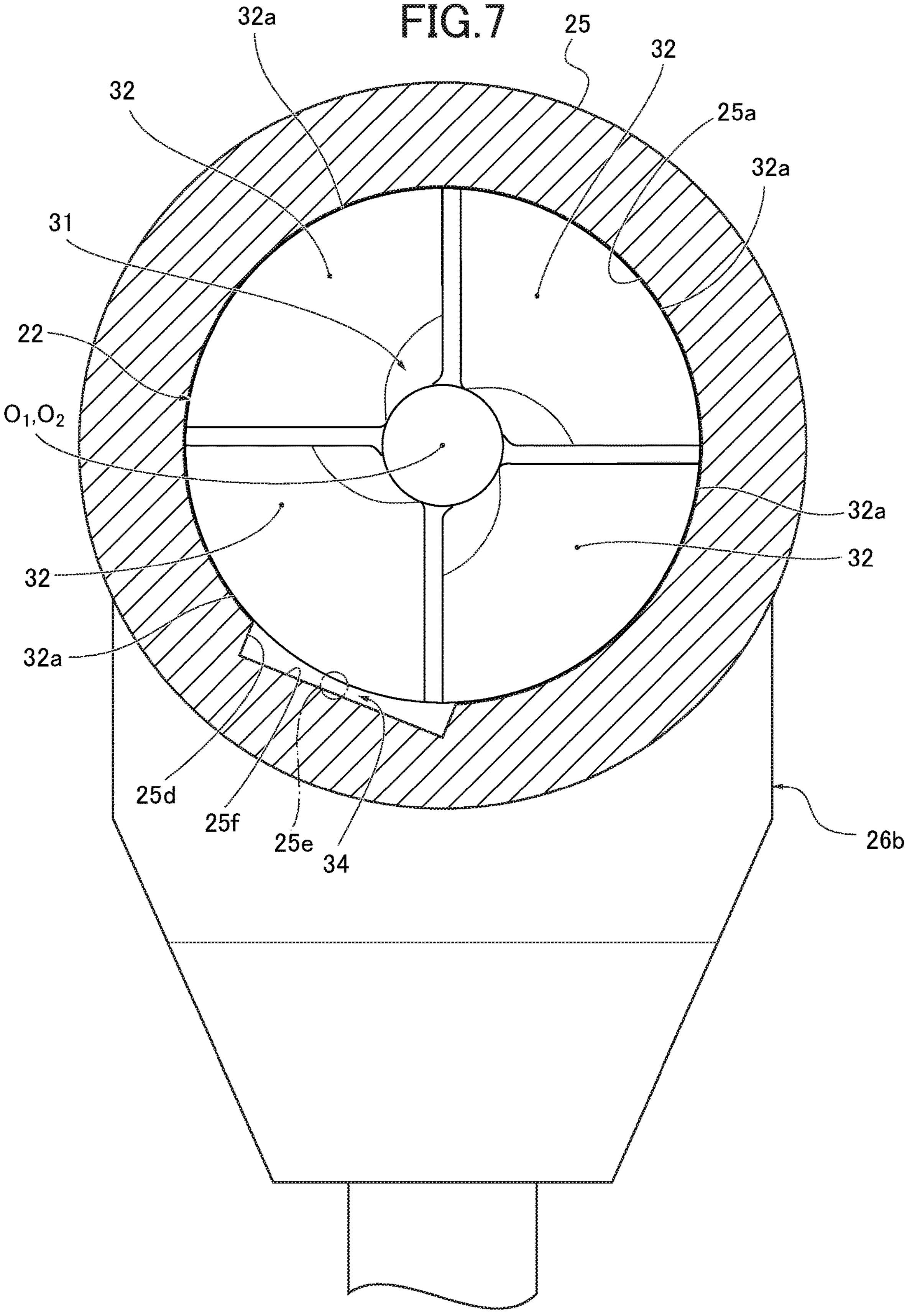
FIG. 7 is a cross-sectional view illustrating a main part of a first modification of the gas-liquid separator of the first embodiment.

Note that the swirling direction by the swirling flow generator 22 is not limited to the clockwise direction illustrated in FIG. 7 and may be the opposite direction. In addition, an angle at which the central position of the communication portion 34 in the pipe circumferential direction (the central position 25*e* of the bulging portion 25*d* in the pipe circumferential direction) is shifted with respect to the vertical direction, that is, an angle formed by a line extending vertically downward through the central axis $O_1$ and a line connecting the central axis $O_1$ and the central position of the communication portion 34 in the pipe circumferential direction (the central position 25*e* of the bulging portion 25*d* in the pipe circumferential direction) may be set as desired.

Figure 8:
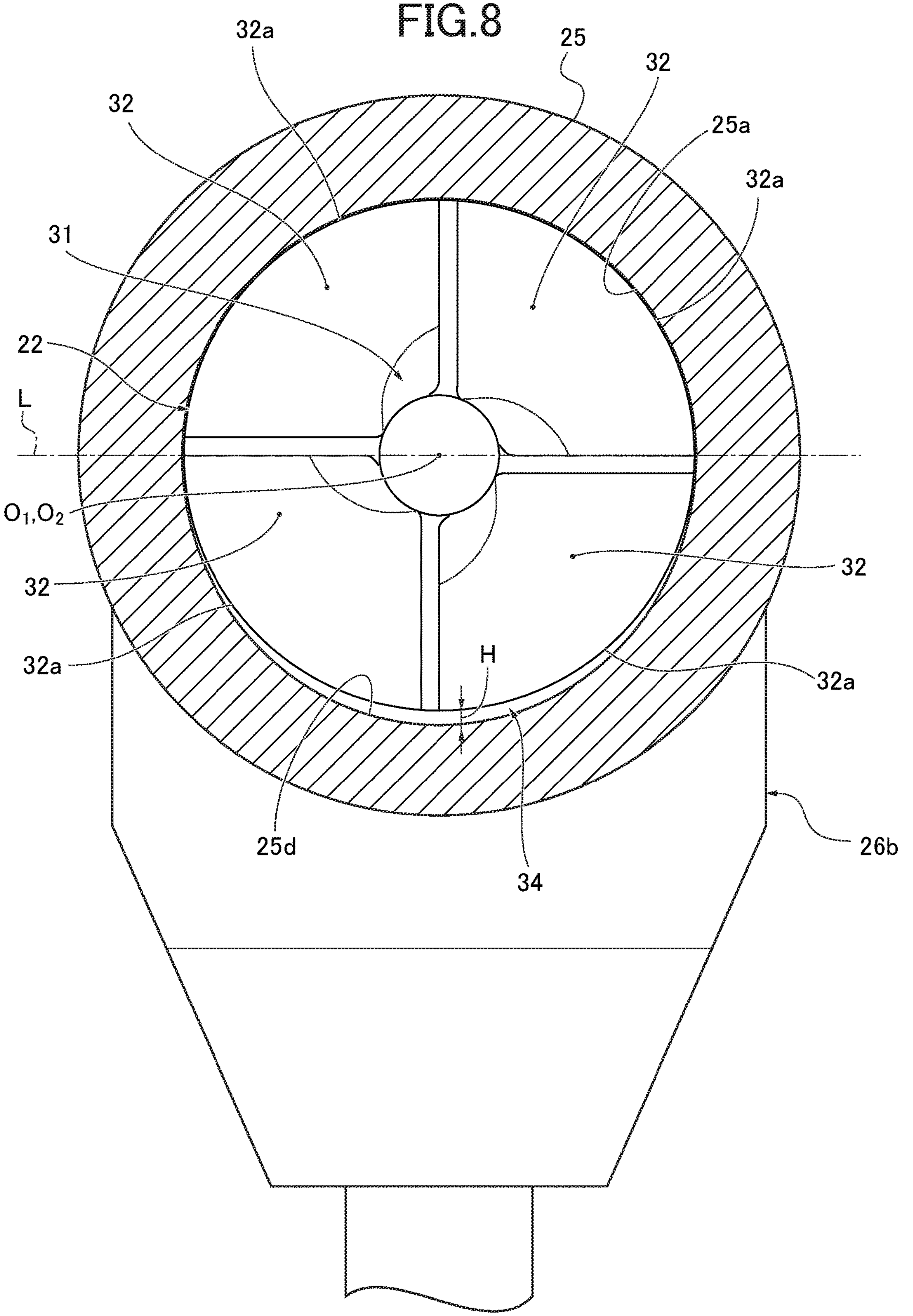
FIG. 8 is a cross-sectional view illustrating a main part of a second modification of the gas-liquid separator of the first embodiment.

Further, in the gas-liquid separator 16 of the first embodiment, the bulging portion 25*d* is formed by protruding or denting a part of the inner circumferential surface 25*a* outwardly in the pipe radial direction to have the steps. However, the configuration of the bulging portion 25*d* is not limited thereto. The bulging portion 25*d* may be formed by progressively protruding a portion of the inner circumferential surface 25*a* of the first pipe 25 outward in the pipe radial direction. That is, in the gas-liquid separator 16, the communication portion 34 may be formed by such a bulging portion 25*d*. In particular, the circumferential shape of the first pipe 25 viewed from the pipe axial direction may include a perfect circle in the upper half of the pipe from the horizontal line L passing through the central axis $O_1$ and an ellipse in the lower half of the pipe from the horizontal line L, as illustrated in FIG. 8, for example. Note that the perfect circle is a circle centered on the central axis $O_1$. In addition, the ellipse is an ellipse with a long radius along the vertical direction passing through the central axis $O_1$.

The swirling flow generator 22 includes a plurality of blades 32 all having the same shape, and the trajectory along the distal ends 32*a* of the blades 32 draws a circle about the central axis $O_1$ when viewed from the pipe axial direction. Therefore, in the swirling region 22*a*, a gap or clearance is created between the inner circumferential surface 25*a* of the first pipe 25 and the distal end 32*a* of the blade 32 in the region below the horizontal line L, which becomes the communication portion 34.

Figure 9:
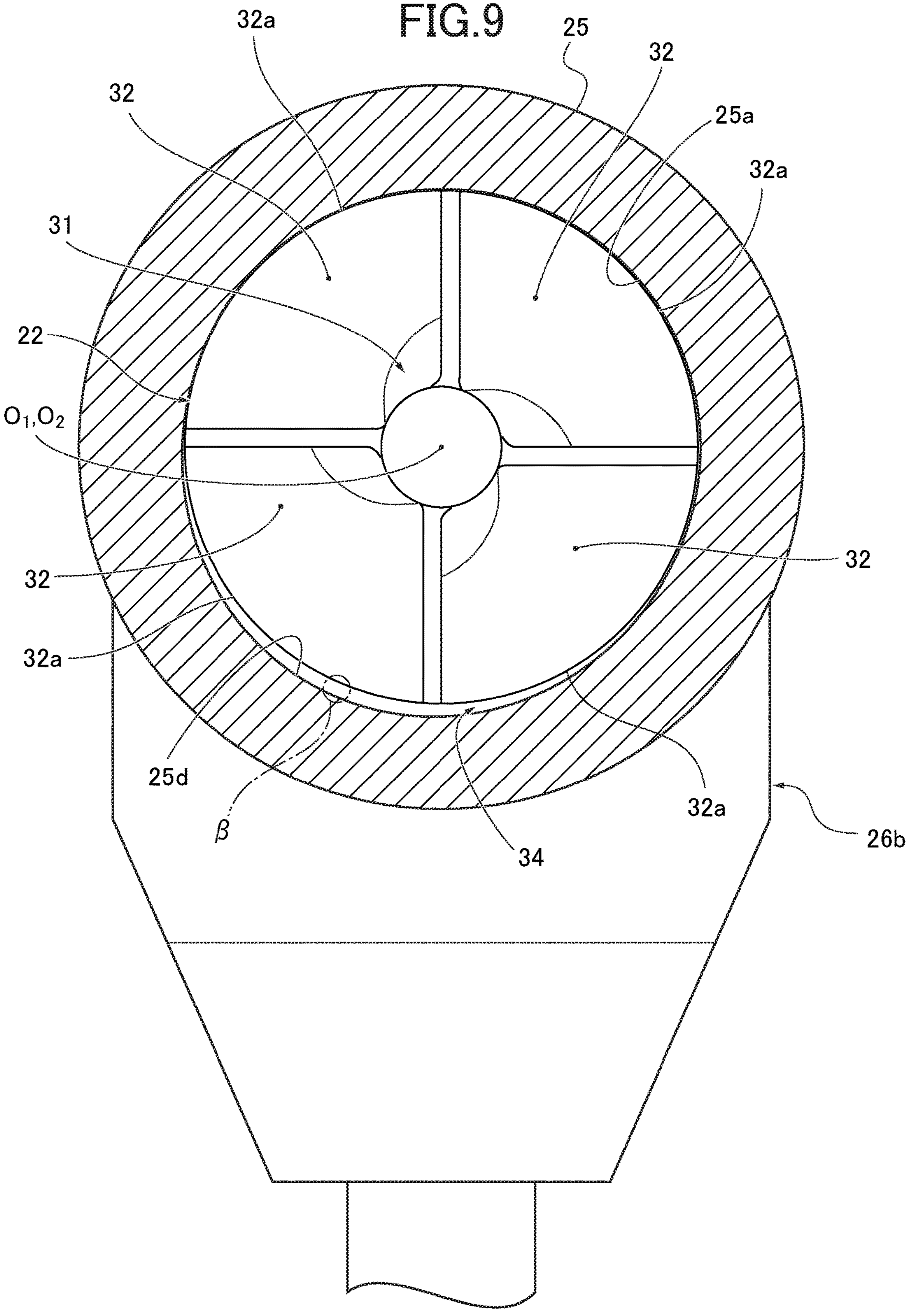
FIG. 9 is a cross-sectional view illustrating a main part of a third modification of the gas-liquid separator of the first embodiment.

Moreover, in the example illustrated in FIG. 8, the circumferential shape of the first pipe 25 viewed from the pipe axial direction includes an ellipse in the lower half of the pipe from the horizontal line L and the ellipse has a long radius along the vertical direction passing through the central axis $O_1$. In this case, the communication portion 34 is set such that the depth of the communication portion 34 is deepest at the position vertically below the central axis $O_1$ in the vertical direction. However, the shape of the communication portion 34 is not limited thereto. As illustrated in FIG. 9, a position β at which the depth of the communication portion 34 is deepest may be set at a position shifted by a predetermined angle in the direction in which the gas-liquid two-phase fluid is swirled by the swirling flow generator 22 (clockwise direction in FIG. 9) with respect to the position vertically below the central axis $O_1$.

In the gas-liquid separator 16 of the first embodiment, the swirling flow generator 22 includes the conical blade support portion 31 and the plurality of blades 32 protruding from the outer circumferential surface 31*a* of the blade support portion 31. However, the shape of the swirling flow generator 22 is not limited to that of the first embodiment. For example, the swirling flow generator may be formed from a spirally twisted plate member. That is, the present disclosure can be applied to any gas-liquid separator including a swirling flow generator including one or more blades that are spirally curved about the central axis $O_1$ of the pipe member 21 and whose distal end in the pipe radial direction is continuous over the entire circumference of the pipe member 21 when viewed from the pipe axial direction.

In addition, in the first embodiment, the swirling flow generator 22 includes four blades 32 each of which is set to have the winding angle θ1 of about 90°. However, the number of the blades 32 is not limited to four and the angle of the winding angle θ1 is not limited to about 90°. The number of the blades 32 and the angle of the winding angle θ1 may be set as desired as long as the distal ends 32*a* of the blades 32 are continuous over the entire circumference of the pipe member 21 in the swirling flow generator 22 when viewed from the pipe axial direction.

In the first embodiment, the water storage tank 23 is connected to the distal end opening 26*e* of the vertical portion 26*b*. However, the vertical portion 26*b* and the water storage tank 23 may not necessarily be installed. The liquid discharged from the drain opening 26*c* may be directly discharged to the outside of the pipe member 21 without being stored. Further, the bypass pipe 24 is not necessarily provided.

In the first embodiment, even in the exhaust gas recirculation system S, the gas-liquid separator 16 is installed at the position downstream of the low-pressure EGR valve 14 and the position upstream of the compressor 5*a* of the turbocharger 5 (the position surrounded in the alternate long and short dash line X in FIG. 1). However, the present disclosure is not limited to the above example. The gas-liquid separator 16 is installed at a position where condensed water is generated in the exhaust gas recirculation system S. Accordingly, the gas-liquid separator may be installed at a position downstream of the intercooler 6 and upstream of the cylinder air supply port of the internal combustion engine 1 (a position surrounded by an alternate long and short dash line Y in FIG. 1).

In addition, in the first embodiment, the internal combustion engine 1 is a diesel engine mounted on a vehicle. However, the present disclosure is not limited thereto, and the internal combustion engine 1 may be a gasoline engine.

In the first embodiment, the gas-liquid separator 16 is applied to the exhaust gas recirculation system S of the internal combustion engine 1. However, the application of the gas-liquid separator 16 is not limited to the above example. For example, the gas-liquid separator 16 may be applied to a refrigeration cycle device to separate the gas refrigerant and the liquid refrigerant. That is, the gas-liquid separator of the present disclosure may be applied to a device that separates gas and liquid from a gas-liquid two-phase fluid.

In addition, the shape of the pipe member 21, the connection point of the first pipe 25 and the like, the diameter dimensions of the pipes, the material to be used, and the like are not limited to those illustrated in the first embodiment and may be set as desired.

The invention claimed is:

1. A gas-liquid separator comprising:

a pipe member through which a gas-liquid two-phase fluid flows, the gas-liquid two-phase fluid comprising gas and liquid; and a swirling flow generator within the pipe member, the swirling flow generator being configured to swirl the gas-liquid two-phase fluid to separate the gas and the liquid therefrom, wherein the swirling flow generator comprises blades that are spirally curved about a central axis of the pipe member, wherein each of the blades comprises a distal end in a pipe radial direction of the pipe member, the distal ends of the blades being continuous over an entire circumference of the pipe member when the pipe member is viewed from an axial direction thereof, wherein a communication portion is provided between the pipe member and the swirling flow generator by forming a bulging portion, wherein the bulging portion is formed on an inner circumferential surface of the pipe member to extend in the axial direction, wherein the communication portion is configured to communicate a first space upstream of the swirling flow generator with a second space downstream of the swirling flow generator, wherein when the swirling flow generator is disposed in a swirling region, the distal ends of the blades, except for a portion facing the bulging portion on the inner circumferential surface of the pipe member, contact the inner circumferential surface of the pipe member so that the swirling flow generator is supported by the pipe member, wherein the bulging portion comprises a bottom surface that is flat in a horizontal direction, and wherein the bulging portion has a depth that is configured to be shallowest at a central position and gradually deepens toward both end portions in a pipe circumferential direction.

2. The gas-liquid separator according to claim 1, wherein a central position of the communication portion in the pipe circumferential direction is positioned below the central axis in a gravity direction.

3. The gas-liquid separator according to claim 2, wherein the central position of the communication portion in the pipe circumferential direction is shifted from a position below the central axis in a vertical direction, in a swirl direction of the gas-liquid two-phase fluid which is swirled by the swirling flow generator.

4. The gas-liquid separator according to claim 1, wherein the pipe member is disposed such that the central axis of the pipe member is arranged along the horizontal direction when mounted on a vehicle.

5. The gas-liquid separator according to claim 1, wherein the bulging portion is formed by protruding a part of the inner circumferential surface outwardly in the pipe radial direction to have steps.

6. The gas-liquid separator according to claim 1, wherein the depth of the bulging portion is set at about 5% of a radius dimension of the pipe member at the central position in the pipe circumferential direction.

7. The gas-liquid separator according to claim 1, wherein a width dimension of the bulging portion is set to about 15% of a circumferential length of the inner circumferential surface of the pipe member.

* * * * *